United States Patent Office 3,439,557
Patented Apr. 22, 1969

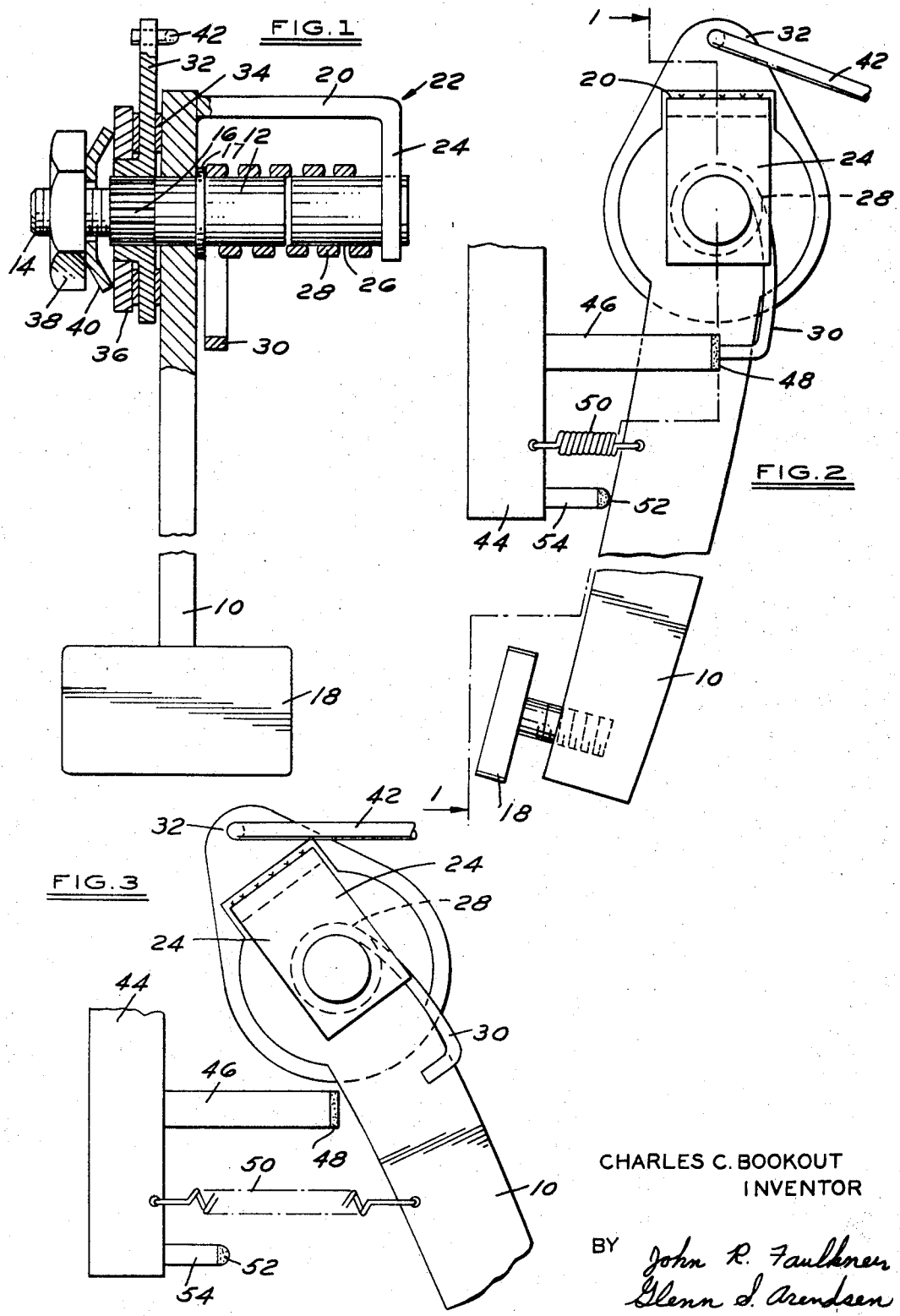

3,439,557
FRICTION REGULATING MECHANISM
Charles C. Bookout, Livonia, Mich., assignor to Ford Motor Company, Dearborn, Mich., a corporation of Delaware
Filed Dec. 2, 1966, Ser. No. 598,853
Int. Cl. G05g 5/06, 1/14; F16d 19/00
U.S. Cl. 74—531    7 Claims

ABSTRACT OF THE DISCLOSURE

A clutch pedal for a cable actuated clutch system includes a built-in tension regulating system that automatically restores cable tension each time the pedal is returned to its rest position. Rest tension in the cable is opposed primarily by the friction between the cable arm and the pedal arm and this friction assists in transmitting the clutch actuating force from the pedal to the cable when the clutch is actuated.

---

This invention provides a mechanism that maintains a constant rest tension in a cable connecting an actuating device such as a clutch pedal with an operating device such as a cluch pressure plate. The mechanism is useful particularly in cable operated automotive clutch and brake systems.

Maintaining a minimum tension in cables used to transmit an actuating force from a foot or hand operated device to an operating device prevents noise and damage and provides uniformity of operation regardless of wear. A mechanism performing such a function must of course permit cable tension to increase many times when the system is actuated.

One system in which such a regulating mechanism is essential is described in U.S. Patent No. 3,392,812 to Kaptur et al., and assigned to the assignee of this application. In that clutch, a minimum rest tension must be maintained in the actuating cable to prevent misalignment of the clutch release bearing and noise and damage of the other components. In addition, rest tension must be kept below a maximum to prevent excessive release bearing loads resulting from changes caused by wear of the clutch friction material, temperature changes, etc., and an actuating tension several times greater must be transmitted when the clutch is being engaged or disengaged.

The tension regulating mechanism of this invention performs the above functions with a minimum of components. in the regulating mechanism, a cable arm is attached to a cable under tension. An actuating arm movable from a rest position to an actuating position contacts frictionally the cable arm. A locking spring or equivalent means locks the actuating arm to the cable arm when the actuating arm is moved away from its rest position and unlocks the arms when the actuating arm is in its rest position. Thus, each time the actuating arm moves to its rest position, cable tension moves the cable arm until the tension equals the frictional force existing between the cable arm and the actuating arm.

Details of the construction and operation of the regulating mechanism of this invention are presented in the following description of the structure shown in the drawings.

In the drawings, FIGURE 1 is a front view of a clutch pedal having the regulating mechanism of this invention associated therewith. A stop member and a pedal positioning spring have been removed from FIGURE 1 for clarity. FIGURE 2 is a side view of the pedal in its rest position showing the stop member and the pedal positioning spring, and FIGURE 3 is a side view with the pedal in an actuating position.

Referring to FIGURE 1, a clutch pedal arm 10, the actuating arm, is supported rotatably on a horizontal shaft 12 for pivotal movement in a vertical plane. Shaft 12 has a threaded portion 14 on one end and is splined for a short distance adjacent the threaded portion 14 as at 16. A flange 17 is formed on shaft 12 a short distance in from splines 16.

A pedal pad 18 is mounted on the lower end of pedal arm 10 and the long leg 20 of an L-shaped member indicated generally by 22 is fastened to the upper end. The short leg 24 of L-shaped member 24 turns downward to project across the unthreaded end of shaft 12. An anchor member 26 is fastened to short leg 24 and projects toward the end of shaft 12 terminating a short distance from the end thereof.

Anchored on member 26 is a coil spring 28. Spring 28 crosses the gap between member 26 and shaft 12 and has several coils wound on shaft 12. These coils terminate in a tang 30 projecting downward parallel to pedal arm 10.

A cable arm 32 having friction material 34 on one side thereof is splined to shaft 12 through splines 16 so friction material 34 is between pedal arm 10 and cable arm 32. A pressure plate 36 bears on the other side of cable arm 32. A nut 38 threadably engages threaded portion 14 and urges Belleville washer 40 against pressure plate 36. The actuating cable 42 is fastened to the upper portion of cable arm 32.

In FIGURES 2 and 3, a depending portion of the instrument panel frame is represented by the numeral 44. A stop member 46 is fastened to frame 44 and projects toward tang 30. At the end of member 46 is a piece of cushioning material 48 that contacts tang 30 when pedal arm 10 is in its rest position shown in FIGURE 2. A pedal positioning spring 50 is tensioned between pedal arm 10 and frame 44 to pull arm 10 into contact with the cushioning tip 52 of a positioning member 54.

Operation

Coil spring 28 is wound tightly around shaft 12 so it normally locks shaft 12 to anchor member 26. Thus, when pedal arm 10 is moved to its actuating position shown in FIGURE 3 pedal arm 10 is locked to cable arm 32 through member 22, member 26, coil spring 28, shaft 12 and splines 16 and the cable tension increases to actuate the clutch (not shown) attached to the other end of cable 42.

When pedal arm 10 moves under the influence of the clutch engaging springs (not shown) and tension spring 50 to its rest position shown in FIGURE 2, stop member 46 acts through cushioning material 48 to move tang 30 slightly counterclockwise, thereby loosening the coils of spring 28 on shaft 12. This loosening in sufficient to unlock shaft 12 from pedal arm 10. The remaining friction between spring 28 and shaft 12 and between arm 10 and shaft 12 is minor and the tension in cable 42 is opposed primarily by the frictional force acting on friction material 34 between cable arm 32 and pedal arm 10. Cable arm 32 pivots clockwise in FIGURE 2 until the friction force balances the cable tension. Thus, when pedal arm 10 returns to its rest position after each operation, the tension in cable 42 automatically adjusts to a preselected value. Tightening or loosening nut 38 increases or decreases the normal force on frictional material 34, thereby increasing or decreasing the rest tension on cable 42.

As pedal arm 10 moves away from its rest position, the coils of spring 28 and the frictional force existing between pedal arm 10 and cable arm 32 by virtue of friction material 34 rotate shaft 12 slightly counterclockwise as viewed in FIGURES 2 and 3. This counterclockwise rotation is sufficient to move tang 30 away from stop member 46 and spring 28 then grips shaft 12 tightly to lock pedal arm 10 to cable arm 32. Continued counterclockwise movement of pedal arm 10 then rotates cable arm 32 to actuate the clutch.

In some applications, friction material 34 can be eliminated and the friction force can be established by direct contact between arm 32 and arm 10. Generally, a Y-shaped support bracket (not shown) fastens at one side to threaded portion 14 and at the other side to anchor member 26 outboard of leg 24 to mount the regulating mechanism to supporting hardware. Such a bracket also can fasten on shaft 12 and anchor member 26 between pedal arm 10 and leg 24. The moment arm of coil spring 28 is small compared to the moment arm of cable 42 so a relatively small coil spring will transmit large values of force from pedal arm 10 to cable 42.

Thus, the compact regulating mechanism provided by this invention automatically and accurately restores the rest tension in a cable while transmitting large values of actuating force to the cable. The friction force used to establish the rest tension can be adjusted easily and does not interfere with the transmission of actuating forces.

I claim:

1. A friction regulating mechanism comprising
a cable arm attached to a cable under tension,
an actuating arm being movable from a rest position to an actuating position and contacting frictionally said cable arm, the amount of frictional force between said cable arm and said actuating arm determining the major amount of rest tension in said cable and assisting in transmitting an actuating force to the cable arm when the actuating arm is moved toward its actuating position, and
means locking said actuating arm to said cable arm when the actuating arm is moved away from the rest position, said means unlocking the arms when the actuating arm is in its rest position to permit movement of the cable arm to restore the rest tension in the cable.

2. The regulating mechanism of claim 1 comprising a shaft attached to said cable arm, said shaft supporting rotatably said actuating arm.

3. The regulating mechanism of claim 2 in which the locking means comprises a coil spring anchored to the actuating arm and wound around the shaft, said coil spring locking on said shaft when the actuating arm moves away from its rest position.

4. The regulating mechanism of claim 3 comprising a stop member contacting one end of the coil spring when the actuating arm is in its rest position to unlock the coil spring from the shaft.

5. The regulating mechanism of claim 4 comprising adjusting means for adjusting the friction between the cable arm and the actuating arm.

6. The regulating mechanism of claim 5 in which the adjusting means comprises a member fastened threadably on said shaft so rotation of said member varies the friction between said cable arm and said actuating arm.

7. The regulating mechanism of claim 1 comprising adjusting means for adjusting the friction between the cable arm and the actuating arm.

References Cited

UNITED STATES PATENTS

| Re. 21,623 | 11/1940 | Bacon | 74—501 X |
|---|---|---|---|
| 1,043,121 | 11/1912 | Mahoney. | |
| 1,392,936 | 10/1921 | Greene | 192—81 |
| 1,485,419 | 3/1924 | Montagne. | |
| 2,581,080 | 1/1952 | Cushman | 74—501.5 |
| 2,749,825 | 6/1956 | Hirasuna | 74—531 X |
| 2,810,300 | 10/1957 | Pigford | 74—501.5 |
| 3,185,276 | 5/1965 | Sajovec. | |

FOREIGN PATENTS 127,697    6/1919    Great Britain.

OTHER REFERENCES

"Variable Increment Drive," Henkel, p. 526 of IBM Tech. Disclosure Bull., vol. 7, No. 6, November 1954, 192/coil.

FRED C. MATTERN, JR., *Primary Examiner.*

C. F. GREEN, *Assistant Examiner.*

U.S. Cl. X.R.

74—512, 560, 599; 192—99